United States Patent [19]

Kamigaito et al.

[11] Patent Number: 4,774,103

[45] Date of Patent: Sep. 27, 1988

[54] METHOD OF REINFORCING A CERAMIC BODY OF SILICON CARBIDE

[75] Inventors: Osami Kamigaito; Haruo Doi; Shoji Noda, all of Aichi, Japan

[73] Assignee: Kabushiki Kaisha Toyota Chuo Kenkyusho, Yokomichi, Japan

[21] Appl. No.: 834,578

[22] Filed: Feb. 28, 1986

[30] Foreign Application Priority Data

Mar. 14, 1985 [JP] Japan .................................. 60-51522

[51] Int. Cl.$^4$ ..................... C04B 35/52; C04B 35/58; C04B 35/84
[52] U.S. Cl. ......................................... 427/38; 501/88; 501/92; 264/81; 264/82; 264/121; 423/DIG. 9; 204/192.11; 204/192.16
[58] Field of Search ..................... 501/92, 88; 423/345, 423/346, DIG. 9; 148/4, 900; 427/38; 204/192.11, 192.16; 264/81, 82, 121; 250/492.3, 492.2

[56] References Cited

U.S. PATENT DOCUMENTS

| 3,620,827 | 11/1971 | Collett | 264/81 |
| 3,725,099 | 4/1973 | Nozik et al. | 106/288 |
| 3,900,636 | 8/1975 | Curry et al. | 427/38 |
| 4,571,348 | 2/1986 | Troxell | 427/38 |
| 4,576,923 | 3/1986 | Broussaud et al. | 501/98 |
| 4,592,129 | 6/1986 | Legge | 29/572 |
| 4,612,297 | 9/1986 | Kasai et al. | 501/97 |
| 4,624,858 | 11/1986 | Capra et al. | 427/38 |

FOREIGN PATENT DOCUMENTS

| 166349 | 1/1986 | European Pat. Off. | 204/192.11 |
| 188270 | 7/1986 | European Pat. Off. | 501/92 |
| 57-149867 | 9/1982 | Japan | 501/88 |
| 478016 | 1/1938 | United Kingdom | 501/98 |
| 906159 | 9/1962 | United Kingdom | 423/345 |
| 2075965 | 11/1981 | United Kingdom | 501/96 |

OTHER PUBLICATIONS

"Ceramic Processing", Publication 1576, National Academy of Sciences, Washington, D.C., 1968, p. 86.
"Ion Implantation in SiC", Marsh, in *Silicon Carbide*-1973, Proc. 3rd Int. Conf. on SiC, eds. Marshall, Faust, and Ryan.

Primary Examiner—William R. Dixon, Jr.
Assistant Examiner—Andrew B. Griffis
Attorney, Agent, or Firm—Oblon, Fisher, Spivak, McClelland & Maier

[57] ABSTRACT

Silicon and nitrogen ions are implanted in a ceramic body of silicon carbide and the ceramic body is heated in a nonoxidizing atmosphere, whereby it is reinforced.

6 Claims, No Drawings

METHOD OF REINFORCING A CERAMIC BODY OF SILICON CARBIDE

BACKGROUND OF THE INVENTION

1. Field of the Invention

This invention relates to a method of reinforcing a ceramic body of silicon carbide. More particularly, it relates to a method of forming silicon nitride in the surface layer of a ceramic body of silicon carbide.

2. Description of the Prior Art

Ceramics, such as silicon nitride or carbide and alumina, are excellent materials for making machine parts. They are generally satisfactory in properties. For example, a sintered body of silicon nitride having a simple shape has a strength of at least 1 GPa. An actual machine part has, however, a complicated shape which gives it a portion or portions of unsatisfactorily low strength. The presence of any such portion limits the applicability of ceramics for making a machine part. The reinforcement of any such portion can be realized by, for example, improving the design of the part or the process for making it, or using a material of improved composition. No such prior attempt has, however, been always successful.

SUMMARY OF THE INVENTION

It is, therefore, an object of this invention to provide an improved method of reinforcing a ceramic body of silicon carbide.

The inventors of this invention thought that if ions could be implanted in a ceramic body to modify its surface, it would be possible to lower the sensitivity of any flaw on its surface to any stress applied thereto and thereby improve the strength of any portion thereof. They have made extensive research efforts to realize their concept and finally been able to achieve this invention.

According to this invention, there is, thus, provided a method of reinforcing a ceramic body of silicon carbide which comprises implanting silicon and nitrogen ions in the ceramic body and heating it in a nonoxidizing atmosphere.

DETAILED DESCRIPTION OF THE INVENTION

According to this invention, the reinforcement of a ceramic body of silicon carbide is effected by implanting silicon and nitrogen ions in the ceramic body and heating it in a nonoxidizing atmosphere.

In this invention, the ceramic body is a compacted and fired product of silicon carbide powder having a desired shape. It may contain a sintering aid, and other additives, such as B, C, BN, Al, AlN, Be, $Al_2O_3$ and $Y_2O_3$, which are added to it when it is sintered. It can be produced by any appropriate customary method, such as atmospheric sintering, hot pressing or hot isostatic pressing. Prior to the implantation of silicon and nitrogen atoms, it is preferable to grind the surface of the body to a smoothness of, say, 0.5 s (i.e. a maximum peak-to-peak valley height of 0.5 $\mu$m) to remove any unevenness that would otherwise give rise to the concentration of stress, and cleanse it with an organic solvent, such as acetone.

The silicon and nitrogen ions may be implanted into any desired portion of the ceramic body. It is advisable to implant the ions to a depth of, say, 0.03 to 2.0 microns below the surface of the body to ensure its reinforcement. The atoms of silicon and nitrogen are heated, the resulting silicon vapor or nitrogen gas is ionized and accelerated to enable implantation. Either the silicon or nitrogen ions can be implanted first. If a larger amount of nitrogen ions are going to be implanted, however, it is advisable to start with the silicon ions, as the nitrogen atoms are likely to form blisters.

As the accelerator, it is possible to use, for example, a Cockcroft-Walton, Van de Graaff or linear accelerator, or a cyclotron.

The amounts of the silicon and nitrogen ions which are implanted may have a ratio of 2.4:4 to 3.6:4, including a ratio of 3:4 which is the ratio of the silicon and nitrogen atoms in their compound $Si_3N_4$. Specifically, the silicon ions may be implanted in the quantity of $1.2 \times 10^{17}$ to $5 \times 10^{18}$ ions/cm$^2$, and the nitrogen ions in a quantity which is apparent from the ratio hereinabove stated. If the ratio of the silicon and nitrogen ions does not fall within the ratio hereinabove stated, only a smaller amount of silicon nitride is formed when the ceramic body is subsequently heated. If the amount of the silicon ions is less than what has hereinabove been stated, the effect of reinforcement is slightly reduced. Even if the silicon ions are implanted in any quantity exceeding what has been stated, it is impossible to achieve any corresponding improvement in the strength of the ceramic body.

The amount of energy for accelerating the silicon and nitrogen ions is preferably in the range of 30 keV to 2 MeV. The specific amount of energy to be employed for accelerating the ions of each element depends on the desired depth of their penetration into the ceramic body. Any shortage of the accelerating energy results in only a very small depth of penetration. The silicon nitride which is formed when the ceramic body is heated fails to form a satisfactory bond with the silicon carbide and no satisfactory reinforcement of the ceramic body can be achieved. Any excess of the energy should also be avoided, as no correspondingly better results can be expected.

The ceramic body in which the silicon and nitrogen ions have been implanted is heated in a nonoxidizing atmosphere so that at least a part of the silicon and nitrogen ions may undergo a chemical reaction to form silicon nitride. The nonoxidizing atmosphere may be composed of argon, helium or nitrogen. It is advisable to add 5 to 20% by volume, or preferably 8 to 12% by volume, of hydrogen in order to ensure the satisfactory reaction of silicon and nitrogen.

The ceramic body may be heated at a temperature of 1100° C. to 1600° C. for a period of, say, 0.5 to five hours. If the heating temperature is lower than 1100° C., it is difficult to achieve the satisfactory bonding of the silicon and nitrogen ions and thereby any satisfactory reinforcement of the ceramic body. The implanted ions, particularly the nitrogen ions, are likely to dissipate to a sharply increased degree at a temperature which is higher than 1600° C.

A layer containing silicon nitride is formed on the surface of the ceramic body when it has been heated. The silicon nitride is uniformly distributed on the surfaces of the silicon carbide particles and adhere closely thereto. When the ceramic body is cooled after it has been heated, a compressive stress is produced by the difference in coefficient of thermal expansion between the silicon nitride and the silicon carbide. Silicon nitride has a thermal expansion coefficient of about $3 \times 10^{-6}$/°

C., while that of silicon carbide is about $5\times 10^{-6}/°$ C. Therefore, when the ceramic body is cooled, the silicon nitride shrinks less than the silicon carbide. Since the surface layer containing silicon nitride shrinks less than the inner portion of the ceramic body, the compressive residual stress occurs in the surface layer. This residual stress is considered to contribute, among others, to the reinforcement of the ceramic body.

As no compound or solid solution is formed between silicon nitride and silicon carbide, it has been difficult to mix them in the surface layer of a ceramic body by a conventional chemical method and to obtain an intimate bond therebetween. According to this invention, however, silicon and nitrogen atoms are implanted in the surface of a ceramic body of silicon carbide and caused under heat to react chemically with each other to form silicon nitride. The silicon nitride is intimately mixed with silicon carbide in the surface layer of the ceramic body and improves the surface of the ceramic body. The ceramic body reinforced by the method of this invention has, therefore, a much less sensitivity of any flaw to any stress applied thereto and is by far less liable to fracture.

The invention will now be described more specifically with reference to several examples thereof.

EXAMPLE 1

A sintered body prepared by firing powder of silicon carbide was cut into a 3 mm by 4 mm by 40 mm specimen, which is a specimen for the bending strength test specified by the Japanese Industrial Standard (JIS). The surface of the specimen was ground by a #600 grindstone to a smoothness of about 0.5 s and cleansed ultrasonically with acetone. The specimen was mounted in the sample holder of a Cockcroft-Walton accelerator so that its 4 mm wide surface might define a surface for atomic implantation. Silicon ions were first implanted in that surface, and then nitrogen ions. An accelerating energy of 400 keV was employed for implanting $2\times 10^{17}$ ions of silicon ions per square centimeter of the specimen surface. According to a calculation, the silicon atoms had a projected range of about $3650\pm 800$ Å in the ceramic body. An accelerating energy of 200 keV was employed for implanting the nitrogen ions. The amount of the implanted nitrogen ions was 1.33 times larger than that of the silicon ions. The nitrogen atoms were implanted so as to have a projected range similar to that of the silicon ions and according to a calculation, it was about $3500\pm 700$ Å.

A plurality of specimens were prepared as hereinabove described. They were heated at different temperatures ranging from 1000° C. to 1700° C. as shown in TABLE 1, in a nitrogen gas atmosphere containing 10% by volume of hydrogen. All of the specimens were heated for two hours.

Then, each specimen was examined for bending strength. For this purpose, each specimen was subjected to four point bending under the condition that the surface thereof in which the silicon and nitrogen atoms had been implanted is on the tension side. The specimen was supported over a span of 30 mm, while the load was supported over a span of 10 mm.

A plurality of specimens in which silicon and nitrogen ions had been implanted, but which had not been heated, and also in which no silicon or nitrogen ion had been implanted, were likewise tested for comparative purposes, as shown at C1 and C2, respectively, in TABLE 1.

Five specimens were prepared under each of the conditions shown at 1 to 6, C1 and C2 in TABLE 1 and tested. The test results are shown in TABLE 1.

TABLE 1

| Specimen | 1 | 2 | 3 | 4 | 5 | 6 | C1 | C2 |
|---|---|---|---|---|---|---|---|---|
| Temperature, °C. | 1000 | 1200 | 1300 | 1400 | 1500 | 1700 | 25 | 25 |
| Bending strength, kg/mm$^2$ | 46.0 | 47.0 | 49.0 | 54.3 | 56.0 | 43.8 | 45.7 | 44.2 |

As is obvious from TABLE 1, the mere implantation of the silicon and nitrogen atoms (C1) was insufficient for improving satisfactorily the bending strength of the ceramic body in which no such atom had been implanted (C2). It was found necessary to heat the ceramic body at a temperature of at least 1000° C. The ceramic bodies showed an increasing bending strength with a rise in temperature. The ceramic bodies which had been heated at a temperature of 1400° C. to 1500° C. showed the maximum strength. The ceramic bodies which had been heated at a temperature exceeding 1600° C. were as low in strength as those to which the method of this invention had not been applied.

EXAMPLE 2

The procedures of EXAMPLE 1 were repeated for preparing specimens and implanting silicon and nitrogen ions therein, except that the amounts of the ions were varied as shown in TABLE 2. All of the specimens were heated at a temperature of 1400° C. for two hours in a nitrogen atmosphere. Each specimen was, then, tested for bending strength by the method which had been employed in EXAMPLE 1. The test results are shown in TABLE 2.

TABLE 2

| Specimen | 1 | 2 | 3 |
|---|---|---|---|
| Amounts of ions Si implanted, ions/cm$^2$ N | $1.2 \times 10^{17}$ $1.6 \times 10^{17}$ | $2 \times 10^{17}$ $2.7 \times 10^{17}$ | $3 \times 10^{17}$ $4 \times 10^{17}$ |
| Bending strength, kg/mm$^2$ | 45.6 | 54.3 | 53.0 |
| Specimen | 4 | 5 | 6 |
| Amounts of ions Si implanted, ions/cm$^2$ N | $7 \times 10^{17}$ $9.1 \times 10^{17}$ | $1 \times 10^{18}$ $1.3 \times 10^{18}$ | $5 \times 10^{18}$ $6.5 \times 10^{18}$ |
| Bending strength, kg/mm$^2$ | 52.6 | 47.2 | 45.0 |

As is obvious from TABLE 2, the ceramic bodies generally showed an increasing bending strength with an increase in the amounts of the atoms implanted therein.

What is claimed is:

1. A method of reinforcing a ceramic body of silicon carbide by forming silicon nitride at the surface thereof, which consists essentially of:
    (a) implanting silicon and nitrogen ions in the ceramic body in the amount of about $1.2\times 10^{17}$ to about $5\times 10^{18}$ ions/cm$^2$, and about $1.6\times 10^{17}$ to about $6.7\times 10^{18}$ ions/cm$^2$, respectively, and
    (b) heating said ceramic body in a non-oxidizing atmosphere at a temperature of about 1100° C. to about 1600° C. for about one-half hour to about 5 hours, thereby facilitating the reaction of said implanted silicon and nitrogen ions to form silicon nitride.

2. The method as set forth in claim 1, wherein said non-oxidizing atmosphere contains argon, helium or nitrogen or a mixture thereof.

3. The method as set forth in claim 1, wherein said atmosphere further contains 5 to 20% by volume of hydrogen.

4. The method as set forth in claim 1, wherein said atmosphere contains 8 to 12% by volume of hydrogen.

5. The method as set forth in claim 1, wherein said silicon and nitrogen ions are implanted with accelerating energy in the range of 30 keV to 2 MeV.

6. The method as set forth in claim 1, wherein said silicon and nitrogen ions are implanted to a depth of 0.03 to 2.0 microns below the surface of the ceramic body.

* * * * *